March 17, 1936.  H. N. WALES  2,034,318

DIFFERENTIAL DRIVING MECHANISM

Filed May 24, 1935   2 Sheets-Sheet 1

INVENTOR
HARRY N. WALES
BY
ATTY.

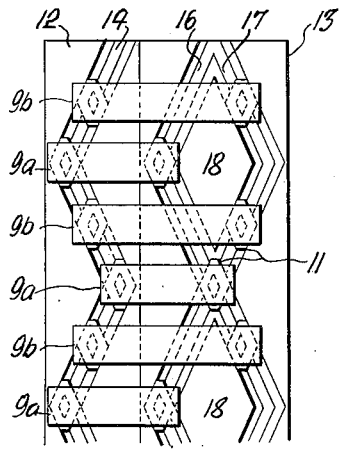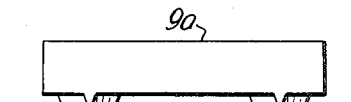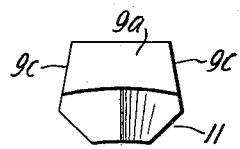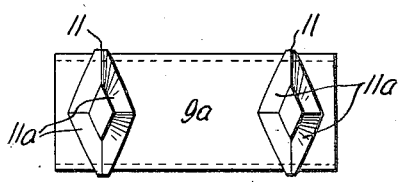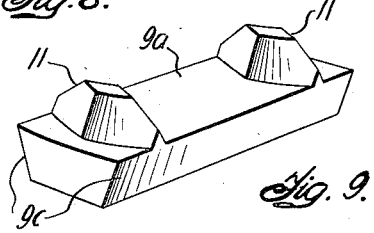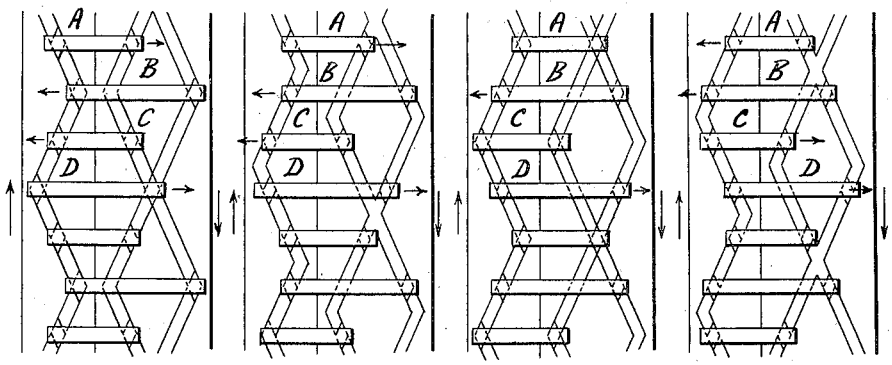

Patented Mar. 17, 1936

2,034,318

UNITED STATES PATENT OFFICE 2,034,318

DIFFERENTIAL DRIVING MECHANISM

Harry Norman Wales, Kew, Victoria, Australia

Application May 24, 1935, Serial No. 23,301
In Australia August 4, 1934

8 Claims. (Cl. 74—389.5)

This invention relates to differential driving mechanism suitable for embodiment in motor propelled vehicles and other mobile machines where it is desired to transmit power with differential motion to road or transport wheels, and has for its general object to provide an improved mechanism of this class.

A further object of the invention is to provide an improved differential mechanism which may be self locking or irreversible or may be designed for any desired degree of reversibility and which consequently will, when applied to automobiles, prevent single wheel spin under practical conditions and resultant objections that frequently occur with conventional toothed gear differential mechanism when the tractive adhesion of one road wheel differs from that of the other road wheel.

In accordance with this invention, the drive is transmitted from an annular driving element to the shafts or axles to be driven by drive transmitting bars or like members which rotate with and are reciprocal substantially axially of the annular driving element and are provided with teeth or like members adapted to co-operate with sinuous or zig zag grooves or tracks extending around the peripheries of two collars that are fast with the respective axles, whereby the sinuous grooves or tracks tend to prevent axial movement of the bars so that the assembly rotates as a unit until operating conditions are such as to require differential motion between the two axles whereupon the bars are permitted to move axially during rotation and thus permit necessary compensation between the two axles.

Two series of drive transmitting bars are provided and are preferably slidably accommodated in guideways extending axially in the internal face or bore of the annular driving member which takes the form of a housing within which the two collars on the respective axles are concentrically disposed. One of these collars has an endless zig zag groove extending around its outer periphery and the other collar has two similar endless zig zag grooves which are, however, opposed to each other so that the adjacent portions or courses of the latter two grooves between the angles or apices thereof are inclined in opposite directions. Each of the drive transmitting bars of one series has two teeth adapted to slidably engage the groove of the first mentioned collar and one of the grooves of the second mentioned collar, while each of the bars of the other series thereof has two teeth adapted to slidably engage the groove of the first mentioned collar and the other of the grooves of the second mentioned collar.

The design is such that the rotating parts are at all times in a state of balance, there being no unbalanced stresses in an axial direction external to the collars.

In order to render the mechanism self locking or irreversible so that when applied to an automobile single wheel spin is avoided, the courses of the various zig zag grooves or tracks of the collars may extend at an angle to the plane normal to the axis which is within the limits of irreversibility. Preferably, however, the courses of the grooves are formed within the angle of reversibility and the mechanism rendered self locking by providing the grooves of the collars and/or the guideways in the annular driving member with side faces of such inclination as will produce a condition of irreversibility and thus prevent the drive from being transmitted from one collar or its axle to the other through the medium of the drive transmitting bars.

If a degree of reversibility is desired, the various angles or inclined faces may be designed accordingly.

The foregoing and other objects, features and advantages of the invention will, however, be more readily appreciated from the following description of a practical embodiment aided by reference to the accompanying drawings wherein—

Figure 5 is a developed view of portions of the periphery of the single and double grooved collars showing the placement of the drive transmitting bars relative thereto.

Figure 1:
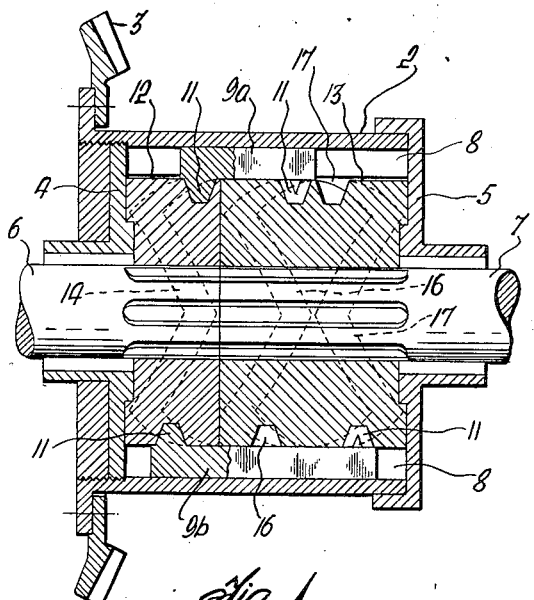
Figure 1 is a longitudinal section of differential driving mechanism according to the invention, the section being taken approximately on line I—I of Figure 2.
Figure 2:
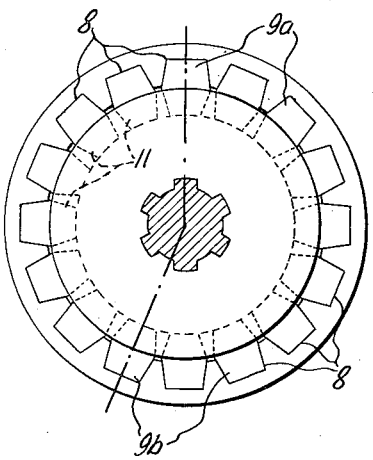
Figure 2 is an end view of Figure 1 with the end caps of the housing removed.

Figures 6, 7, and 8 are side, end and inverted plan views respectively of one of the drive transmitting bars.

Figure 9 is a perspective of a drive transmitting bar.

Figures 10, 11, 12, and 13 are diagrammatic views illustrating the differential action of the mechanism.

In the embodiment illustrated, the annular driving member takes the form of a cylindrical housing 2 provided at one end with a flange to which a crown wheel 3 is secured. The ends of the housing may be adapted to receive end caps 4, 5, which accommodate the axles 6, 7, and carry bearing journals for the differential unit.

The bore or internal face of the housing is provided with a series of circumferentially spaced longitudinally extending slideways 8 for slidably accommodating two series of drive transmitting bars or like members 9a, 9b, each provided with two teeth 11 for slidably engaging grooved collars 12, 13, which are fast on the adjacent ends of the respective axles.

The collar 12, hereinafter referred to as the single grooved collar, is provided around its periphery with an endless groove 14 of zig zag or sinuous form. The collar 13, hereinafter referred to as the double grooved collar is provided around its periphery with two similar endless grooves 16, 17, which are, however, opposed to each other so that, although the apices of the courses of the grooves are axially aligned, the adjacent courses of the two grooves are inclined in opposite directions.

Figures 3, 4:
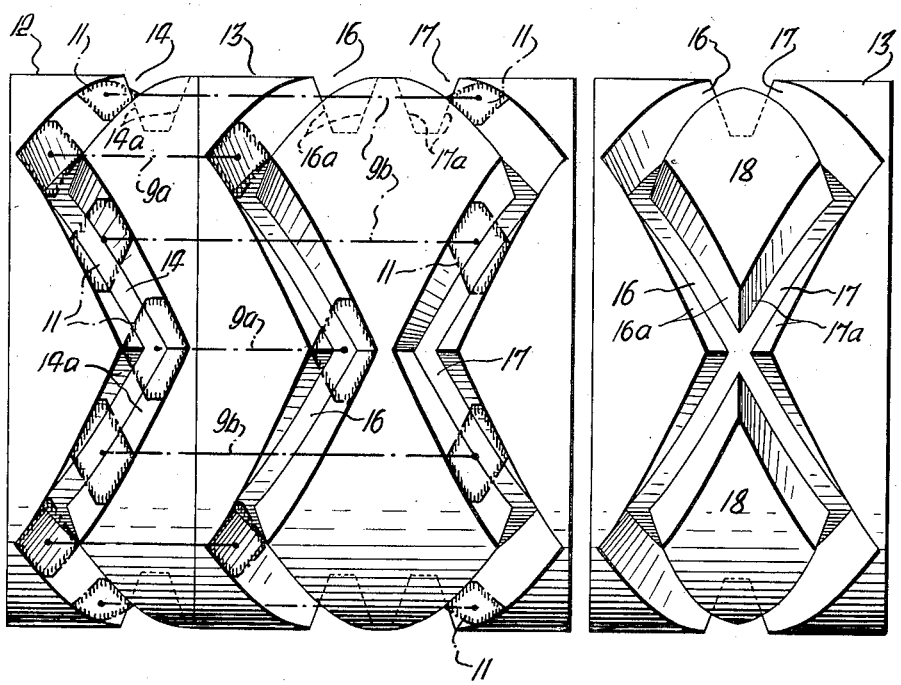
Figure 3 is an elevation on an enlarged scale of the single and double grooved collars seen in Figures 1 and 2, the positions of the drive transmitting bars and their teeth relative to the grooves being indicated by broken lines.
Figure 4 is an elevation of a double grooved collar according to a modification.

The grooves, 16, 17 may be entirely separate from each other as in Figures 1 and 3, but to permit of greater compactness, the two grooves may merge into each other adjacent the apices of the groove courses remote from the end faces of the collar as illustrated in Figures 4 and 5, and 10 to 13. By this arrangement, a series of isolated substantially diamond shaped portions or lands 18 is formed between the grooves.

The teeth of the bars 9a, and 9b, are preferably of substantially diamond shape in plan to enable them to slidably engage and move lengthwise in the grooves of the two collars. The teeth of each bar 9a of one series (hereinafter referred to, in order to assist identification, as short bars) are spaced apart a distance equal to the distance measured axially between the groove 14 of the single grooved collar 12 and the nearer groove 16 of the double grooved collar, when the collars are in such positions that the courses of the respective grooves are parallel with each other and the junctions or apices of the courses are axially aligned. The teeth of each bar 9b of the other series (hereinafter referred to as long bars) are spaced apart a distance equal to the distance between the groove 14 of the single grooved collar and the remote groove 17 of the double grooved collar, when the collars are in such positions that the courses of the respective grooves are parallel with each other and the junctions or apices of the courses are axially aligned.

The short and long bars are arranged alternately around the two collars and consequently when the teeth of the short bars 9a are at the apices or junctions of the courses of their respective grooves 14, 16, as in Figures 1, 3, 5 and 12, the teeth of the long bars 9b will be disposed intermediate the length of the courses of their respective grooves, the latter courses being inclined in opposite directions as will be seen in Figures 3, 5, and 12. Conversely, when the teeth of the long bars are disposed at the apices or junctions of the courses of their grooves 14, 17, as in Figure 10, the teeth of the short bars will be disposed intermediate the length of the courses of their respective grooves, such courses then being inclined in opposite directions. At all positions other than the two mentioned, the two teeth of all of the bars of both series will engage in such portions of their respective grooves as are inclined in opposite directions (see Figures 11 and 13.

When a vehicle embodying the mechanism is travelling along a straight path, the assembly will rotate as a unit, the drive being transmitted to the collars 12, 13, by the bars 9a, 9b, which under such condtions cannot move axially, as the respective teeth 11 of either or both of the series of bars are engaged in oppositely inclined courses of the respective pair of grooves. When the vehicle is cornering or deviates from a straight path, the resultant speeding up of one road wheel and the slowing down of the other road wheel permits the teeth of the drive transmitting bars to slide along their respective grooves and the bars themselves to reciprocate axially within their slideways 8 in the housing 2 so that the desired compensation in the speed of the road wheels is obtained.

The compensating action of the mechanism will be readily appreciated from a consideration of Figures 10 to 13, wherein it is assumed that the single and double grooved collars are turning in opposite directions relative to the annular driving member or housing (not shown), and which is assumed to be stationary, and that the drive transmitting bars are moving axially or lengthwise only. It will be seen that, owing to the collars moving in opposite directions relative to the housing, the teeth of the bars slide along the various grooves, while the bars reciprocate lengthwise as indicated by the arrows. Thus, bar "A" in Figures 10 and 11 is moving to the right while in Figure 12 it is about to change direction and in Figure 13 it is moving to the left. Bar "B" is moving to the left in all figures but shortly after continuing movement from the position seen in Figure 13 it will commence to move to the right. Bar "C" is moving to the left in Figures 10 and 11 while in Figure 12 it is about to change direction and in Figure 13 is moving to the left. Bar "D" is shown moving to the right in all figures but will reverse its direction soon after leaving the position shown in Figure 13.

In order to render the mechanism self locking or irreversible so as to avoid single wheel spin in the event of one road wheel having lesser or greater tractive adhesion than the other road wheel, the arms of the grooves 14, 16, and 17 may extend at an angle to the plane normal to the axis of the collars which is within the limits of irreversibility. Then it would not be possible to drive through from one collar to the other by medium of the drive transmitting bars. Owing to the advisability of reducing as far as possible stresses and backlash, it is preferred that the grooves be cut well within the angle of reversibility as shown in the drawings, and to remove the possibility of a reversible drive between the two collars by giving the grooves and the bar teeth a substantially wedge shape in cross section and/or by imparting a similar formation to the bars themselves and their slideways in the annular driving member.

Accordingly, the angle of the groove courses relative to the plane normal to the axis may be approximately 24° and the angle defined between the side faces 14a, 16a 17a of each groove and between the opposed side faces 11a of the bar teeth may be approximately 40°, and the side faces 9c of the bars and the side faces 8c of their guideways may be inclined at an angle just within the angle of reversibility. By the adoption of such angles, the mechanism will be totally irreversible under practical conditions.

However, it is not essential that the mechanism be totally irreversible and in certain instances it may be desirable to permit of a limited degree of reversibility. This may be achieved by selecting appropriate angles for the courses of the zig zag grooves, and for the side faces of the grooves and the housing slideways 8. Furthermore, the side faces of the grooves and also of the slideways may be parallel, or the side faces of the grooves inclined and the side faces of the slideways parallel, or the side faces of both grooves and slideways may be inclined.

Having now described my invention what I claim as new and desire to secure by Letters Patent is—

1. Improved differential mechanism comprising an annular driving element, two series of drive transmitting members mounted within said driving element so as to rotate therewith while being capable of relative movement in a substantially axial direction, driven axles having their inner end portions disposed within said annular driving element, two collars fast upon the inner ends of the respective axles, one collar having around its periphery an endless substantially zig zag track, the other collar having around its periphery two substantially zig zag tracks which are opposed to each other so that adjacent courses of these two tracks between the apices thereof are inclined in opposite directions, each of the drive transmitting members of one of said series being adapted to slidably engage the single track of the first collar and one of the tracks of the second collar, while each of the drive transmitting members of the other series is adapted to slidably engage the single track of the first collar and the other track of the second collar, whereby said tracks tend to prevent axial movement of the drive transmitting members so that the assembly rotates as a unit until operating conditions are such as to require differential motion between the axles whereupon the tracks permit the drive transmitting members to move axially while rotating so that necessary compensation between the axles takes place.

2. Improved differential mechanism comprising an annular driving element adapted for connection to a source of power, two series of drive transmitting members arranged at circumferentially spaced intervals around the interior of the annular driving element so as to rotate therewith while being capable of reciprocation in a substantially axial direction, and two drive transmitting collars disposed concentrically within said annular driving element, one of the collars having around its periphery an endless zig zag groove, the other collar having two substantially zig zag grooves which are opposed to each other so that adjacent courses of these two grooves between the apices thereof are inclined in opposite directions, each of the drive transmitting members of one of said series having two teeth which slidably engage the groove of the first collar and one of the grooves of the second collar, while each of the drive transmitting members of the other series has two teeth which slidably engage the groove of the first mentioned collar and the other of the grooves of the second mentioned collar.

3. Improved differential mechanism according to claim 2; characterized in that the teeth of one of said series of drive transmitting members are spaced apart a distance equal to the distance measured axially between the groove of the first mentioned collar and the nearer groove of the second mentioned collar when the collars are in such positions that said courses of the respective grooves are parallel with each other and the apices of the courses are axially aligned, and that the teeth of the other series of drive transmitting members are spaced apart a distance equal to the distance measured axially between the groove of the first mentioned collar and the remote groove of the second mentioned collar when the collars are in such positions that the courses of the respective grooves are parallel with each other and the apices of the courses are axially aligned.

4. Improved differential mechanism according to claim 2, wherein the teeth of said drive transmitting members are of substantially diamond shape in plan and adapted to project into the respective grooves formed in the collars and to slidably engage the side faces of said grooves.

5. Improved differential mechanism according to claim 1; characterized in that said driving element is provided at circumferentially spaced intervals around its internal face or bore with axially extending slots and that said drive transmitting members are reciprocal in said slots.

6. Improved differential mechanism according to claim 1; characterized in that the courses of said tracks extend at such an angle to the plane normal to the axis of the collars as to render the mechanism substantially irreversible.

7. Improved differential mechanism according to claim 1; characterized in that the courses of said tracks extend at an angle to the plane normal to the axis of the collars which is outside the angle of irreversibility, and that said tracks and co-operating portions of said drive transmitting members are provided with side faces of such inclination as will render the mechanism substantially irreversible.

8. Improved differential mechanism comprising an annular driving element having in its bore a series of axially extending slots formed at circumferentially spaced intervals, drive transmitting bars accommodated one in each of said slots, driven axles having their inner end portions disposed within said driving element, two collars fast upon the inner ends of the respective axles, one collar having around its periphery an endless zig zag groove, the other collar having around its periphery two zig zag grooves which are opposed to each other so that adjacent courses of these two grooves between the apices thereof are inclined in opposite directions, each drive transmitting bar of one series having two teeth which slidably engage the groove of the first collar and one of the grooves of the second collar, while each bar of the other series has two teeth which slidably engage the groove of the first collar and the other of the grooves of the second collar, the courses of said grooves extending at an angle to the plane normal to the axis of the collars which is outside the angle of irreversibility, the side faces of said grooves and said slots and of said bars and their teeth being of such formation as to permit a limited degree of reversibility.

HARRY NORMAN WALES.